United States Patent [19]

Carl

[11] Patent Number: 4,759,515
[45] Date of Patent: Jul. 26, 1988

[54] DRIVE CONTROL FOR A VERTICAL RUDDER OF AN AIRCRAFT

[75] Inventor: Udo Carl, Bremen, Fed. Rep. of Germany

[73] Assignee: Messerschmitt-Boelkow-Blohm Gesellschaft mit beschraenkter Haftung, Bremen, Fed. Rep. of Germany

[21] Appl. No.: 94,830

[22] Filed: Sep. 9, 1987

[30] Foreign Application Priority Data

Sep. 12, 1986 [DE] Fed. Rep. of Germany ....... 3631063
Nov. 13, 1986 [DE] Fed. Rep. of Germany ....... 3638820

[51] Int. Cl.⁴ .................... B64C 13/04; B64C 13/42
[52] U.S. Cl. .................... 244/76 R; 244/227; 244/78; 244/221
[58] Field of Search .................... 244/75 R, 76 R, 78, 244/221, 227, 228, 224, 226, 236, 87

[56] References Cited

U.S. PATENT DOCUMENTS

| | | | |
|---|---|---|---|
| 2,823,879 | 2/1958 | Smith et al. | 244/227 |
| 2,953,325 | 9/1960 | Hadekel | 244/227 |
| 2,991,028 | 7/1961 | Sedgfield et al. | 244/227 |
| 3,020,889 | 2/1962 | Summerlin et al. | 244/227 |
| 3,426,650 | 2/1969 | Jeuney | 244/78 |
| 3,554,469 | 1/1971 | Snow | 244/227 |
| 4,533,097 | 8/1985 | Aldrich | 244/76 R |

FOREIGN PATENT DOCUMENTS

| | | |
|---|---|---|
| 777273 | 6/1957 | United Kingdom . |
| 780759 | 8/1957 | United Kingdom . |
| 801080 | 9/1958 | United Kingdom . |
| 803577 | 10/1958 | United Kingdom . |
| 803576 | 10/1958 | United Kingdom . |
| 803572 | 10/1958 | United Kingdom . |
| 919266 | 2/1963 | United Kingdom . |

Primary Examiner—Galen Barefoot
Attorney, Agent, or Firm—W. G. Fasse; D. H. Kane, Jr.

[57] ABSTRACT

A vertical rudder control and drive system for an aircraft, such as an airplane, is equipped with electrically controllable vertical rudder drive systems on each side of the aircraft. Additionally, the control system is equipped with a mechanically controllable auxiliary drive system for the operation of the vertical rudder in response to foot pedals operated by the pilot when there should be a failure in the electrically controlled drive systems. A mechanical control signal transmitting link is provided between the foot pedals and the hydromechanical drive for the vertical rudder. Monitoring features enable the pilot to test the mechanical drive system without actually using that system in flight. Preflight tests may be performed.

24 Claims, 6 Drawing Sheets

DRIVE CONTROL FOR A VERTICAL RUDDER OF AN AIRCRAFT

CROSS-REFERENCE TO RELATED APPLICATIONS

This application relates to U.S. Ser. No.: 94,824, which was filed on Sept. 9, 1987; and also relates to U.S. Ser. No.: 94,831, which was filed on Sept. 9, 1987. Both are allowed.

FIELD OF THE INVENTION

The invention relates to a drive control for a vertical rudder of an aircraft, especially an airplane. Primarily the vertical rudders are driven in response to electrically transmitted control signals. For increasing the safety of the drive mechanism, a mechanical signal transmission is arranged in parallel to the electrical signal transmission.

DESCRIPTION OF THE PRIOR ART

Conventional controls for the operation of the vertical rudders employ three hydraulic drive systems with a mechanical deflection feedback. The three systems are arranged in parallel and are controlled in synchronism by means of a signal linkage which is partially constructed as a fail-safe device. The signal input is accomplished by means of a mechanical cable control responsive to the foot pedals operated by the pilot and passing through a force simulating unit which is integrated with the trim adjustment to form a trimmable force simulating unit.

The adjustment of such trimmable force simulating unit is accomplished with two motors which are controlled by a computer for a closed loop position adjustment of the vertical rudder. This closed loop position control function comprises the quasi-stationary trim adjustment as well as the autopilot adjustment of the vertical rudder. In situations where the pilot does not apply any force to the foot pedals, these foot pedals follow the mechanical autopilot control signal and the trim signal. A vertical rudder deflection signal that is required for stabilizing the yawing of the aircraft, is superimposed in a differential manner on the mechanical signal path through a duplicate hydraulic yaw damping input. The vertical rudder deflection signal is produced as a yaw damping signal by a redundant computer system.

The resulting sum signal or differential signal adjusts or drives the vertical rudder through the three independent hydraulic drive systems. In order to protect the structure of the aircraft against unpermissably high vertical rudder deflections in the high speed range, the sum or differential signal is limited by a rudder displacement or deflection limiting unit. Such a deflection limiting unit comprises two motors controlled by a central computer. These motors limit the possible mechanical signal by adjusting the position of a mechanical stop element.

A centering spring is provided for safe-guarding the control system against any simple breaking of the mechanical signal linkage members upstream of the control signal summing input point. If and when a breakage occurs, the centering spring makes sure that the piston cylinder drives keep the vertical rudder in a centered position to prevent deflections, which could lead to unacceptable situations of yaw stability of the aircraft or yaw movement of the aircraft.

OBJECTS OF THE INVENTION

In view of the foregoing it is the aim of the invention to achieve the following objects singly or in combination:

to improve the redundant drive systems for actuating or deflecting the vertical rudder of aircraft, especially airplanes, to avoid the disadvantages of the prior art, more specifically, to assure an acceptable yaw control capability to the aircraft failure conditions;

to reduce the number of system components which simultaneously results in a weight reduction of the vertical rudder control system;

to provide a vertical rudder control system which is at least as safe in its operation as conventional systems and which simultaneously combines the advantages of a "fly-by-wire" system with a simplified vertical rudder control by means of a mechanical signal transmission in case of a total electrical power supply failure; and to assure the availability of the simplified mechanical signal transmission in response to determined failure conditions in the normal electrically controlled vertical rudder drive system.

SUMMARY OF THE INVENTION

The vertical rudder control system of the invention is characterized by the combination of the following features: pilot operated pedals for generating a mechanical control signal, autopilot computer means for generating vertical rudder control signals, a vertical rudder, three hydraulic drive systems operatively connected to the vertical rudder, combined signal transmitting means for electrically or mechanically transmitting a rudder control signal from said autopilot computer or from said pedal, wherein two of said three hydraulic drive systems are electrically controlled electro-hydraulic drive systems each controlled by its own electro-hydraulic control channel, each control channel being connected to at least one control computer for monitoring and controlling the respective electro-hydraulic drive system, wherein the third drive system of said three drive systems is a mechanically controlled hydraulic drive system forming an auxiliary drive for driving said vertical rudder as an alternative drive or after both of the electrically controlled drive systems have failed, said mechanically controlled auxiliary drive system receiving its control input signal from the pilot operated pedals, the arrangement being such that at any one moment only one of the three drive systems is active. Upon failure of any one of the two electrically signalled drive systems, the second electrically signalled drive system is activated, which was the next highest switch-on priority, whereby the mechanically controlled drive system has the lowest switch-on priority. The electrically controlled drive systems execute the vertical rudder deflection instructions produced by the respective control computer, e.g., from a pilot initiated control signal component, a trim signal component, an autopilot signal component, and a yaw damping signal component. The pedal follows in electrical signalled control mode a pedal position corresponding to the trim instructions provided by a trimmable force simulating unit when a force is not applied to the pedal by the pilot. The mechanically controlled system follows, if activated, the pedal position when the pedal is operated by the pilot for deflecting the vertical rudder. The mechanically controlled system comprises a switch-off logic unit which is activated by the computers as long as the electrical control mode is operative, i.e. without fault. When both activating signals from the control computers are absent the mechanically controlled drive system is activated by deactivating the logic switch-off unit. Preferably, all control signals for the electrically controlled drive systems and the switch-off signals to the mechanically controlled drive system pass through a pilot controlled switching unit for testing purposes. One type of a trimmable force simulating unit in the mechanical control signal transmission link is replaceable by or combinable with another type of a trimmable force simulating unit.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
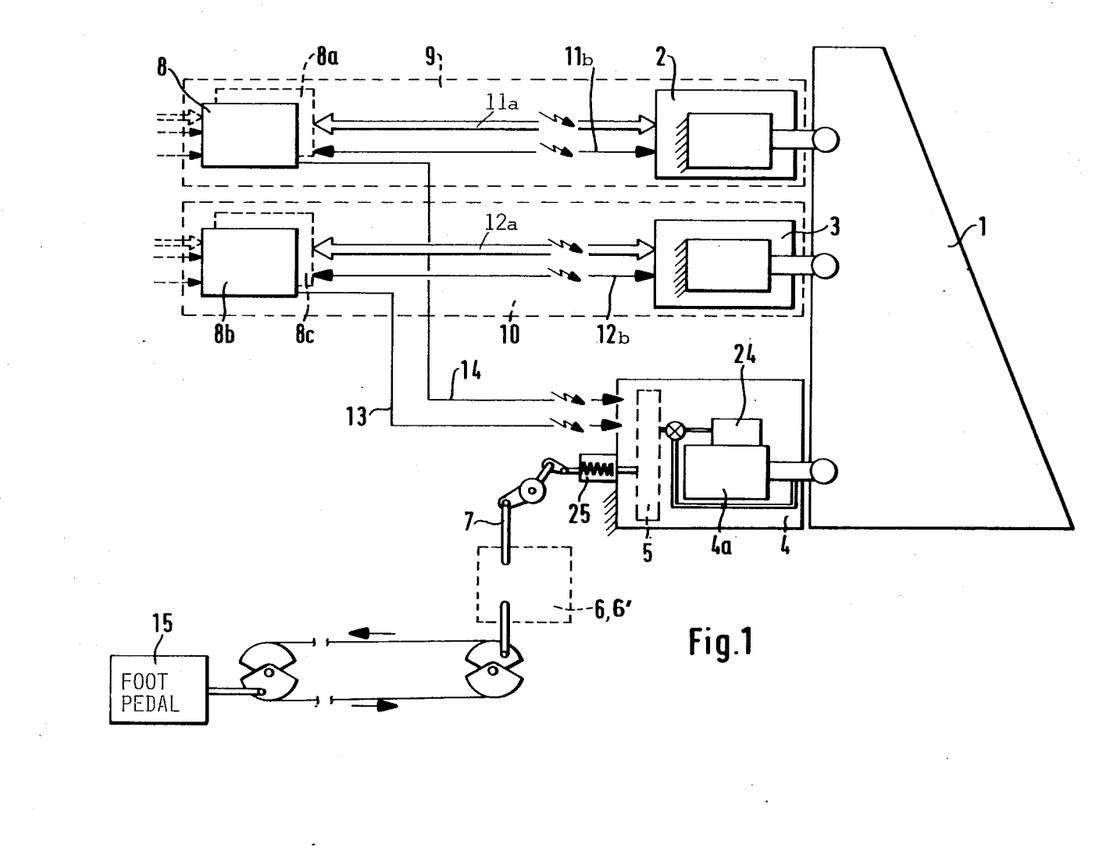
FIG. 1 shows a schematic illustration of a vertical rudder drive and control system according to the invention with two computer controlled primary drives and with a pilot controllable auxiliary mechanical drive.

As shown in FIG. 1, the vertical rudder 1 is driven by two electro-hydraulic drive systems 2 and 3 and by a hydro-mechanical drive system 4. Each of the two drives 2 and 3 has its own drive control channel 9 and 10 under the control of its respective computer 8 and 8a controlling the channel 9 and computers 8b, 8c controlling the channel 10. These computers monitor their respective drive systems. Normally, when there is no trouble in the system one of the primary drive systems is effective the other electro-hydraulic drive system and the auxiliary drive system 4 is passive or in a bypass position. The hydromechanic drive 4 may be used as an alternative drive or it may be used after a failure of both of the primary control channels 9 and 10. The mechanical input control signal for the auxiliary system 4 is supplied through conventional pedals 15 operated by the pilot.

The electro-hydraulic drive systems 2 and 3 operate in accordance with the "active/standby or bypass principle". In accordance with this principle under normal operating conditions only one of the two drive systems 2 or 3 is active and controlled to apply the force necessary for deflecting or moving the vertical rudder 1. During this time the other drive system 3 or 2 and the hydro-mechanical drive system 4 are in a bypass or standby type of situation in which the hydraulic pressurized liquid passes from one cylinder chamber 48a into the other cylinder chamber 48c without any power application to the piston 48b, please see FIG. 5a. However, even in this type of operation the presently inactive systems are continuously monitored to make sure that they would be effective when necessary.

For example, if the control channel 9 is initially the active channel, a switch-over is effected to the second control channel 10 for operating the second electro-hydraulic drive 3 in response to a first fault in the first control channel 9. The fault may be in the respective computer, or in the hydraulic system, or in the drive system. The channel 10 at such time takes over the control of the vertical rudder drive. If a further fault occurs in the now active second control channel 10, or in the second electro-hydraulic drive system 3, the hydro-mechanical system is activated. By reducing the mechanical control from three drive systems to only one drive system 4, the invention avoids the otherwise needed fail-safe construction of the mechanical signal transmitting linkage system and the mechanical centering unit in such linkage system.

According to the invention each of the electro-hydraulic drive systems 2 or 3 performs the vertical rudder deflections simultaneously in response to a drive control signal comprising a pilot initiated signal component, the trim signal component, an autopilot signal component, and a yaw damping signal component. The respective computer 8 produces the composite signal. This is contrary to the prior art in which the drive control signal in purely mechanically signalled redundant drive system configurations is provided in an additive and serial manner. Therefore, the invention obviates those system components which heretofore were necessary for the serially connected control systems and signal paths comprising mechanical signal mixing members.

Each of the electro-hydraulic drive systems 2 and 3 and the hydromechanic drive system 4 are so dimensioned that their power output, or rather, the maximally possible output power, is smaller than or equal to the deflection force occurring during high speed flight when the vertical rudder has reached its maximally permissible deflection angle. However, the output power of these drive systems is sufficiently large for all low speed control situations including failure of the propulsion plant and side wind flight during take-off and landing.

The just mentioned feature of the invention limiting the output power of the drive systems, obviates, as compared to the prior art, a special, independent device for limiting the rudder deflection. Another advantage is seen in that the control system according to the invention cannot cause any rudder deflections with catastrophic consequences even in case of a fault such as jamming of the servo-valve. The computer 8 according to the invention additionally limits as an inherent feature, the rated deflection control signals of the systems 2 and 3 to a respectively permissible value.

Figure 2:
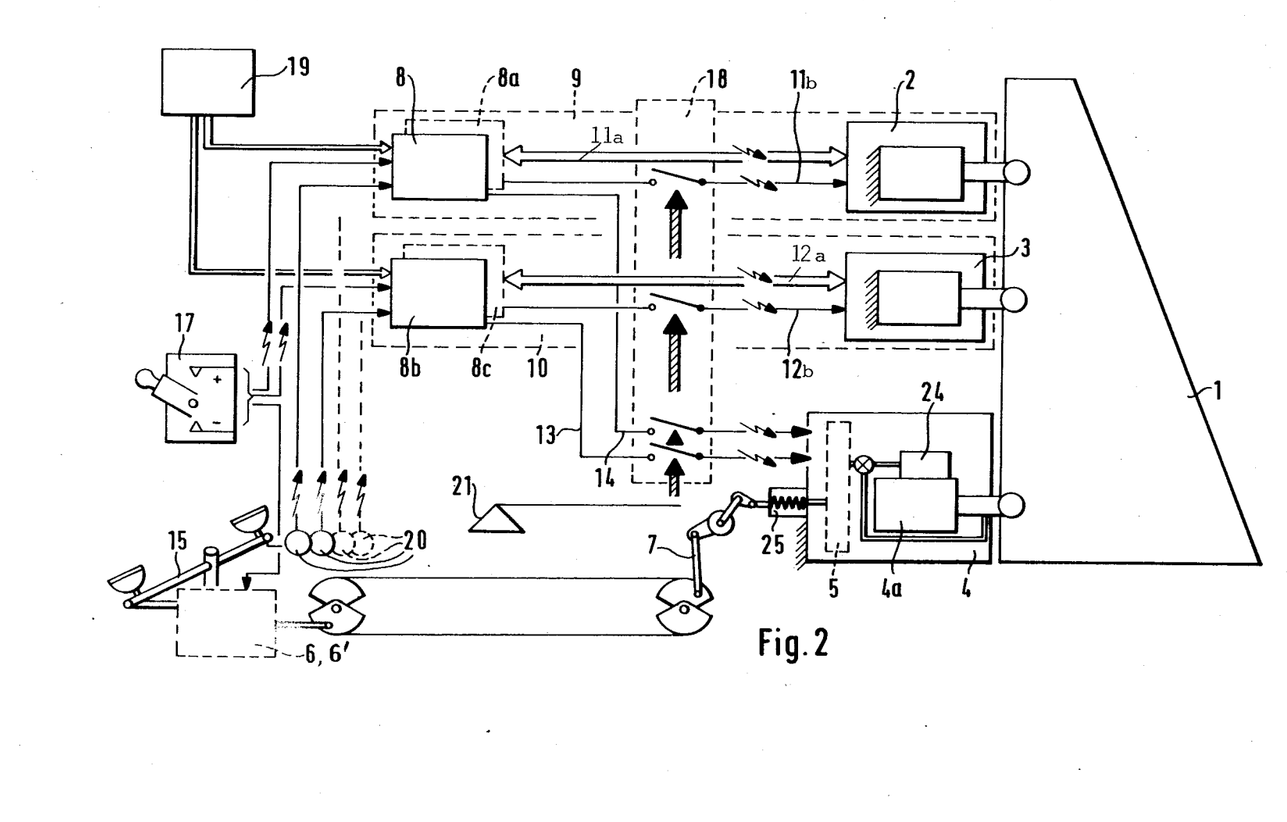
FIG. 2 shows an embodiment similar to that of FIG. 1, but with a force simulating unit located at the pilot's foot pedals rather than near the auxiliary drive.

According to the invention the mechanically controlled hydro-mechanic drive system 4 is provided for use after a second fault in the primary control channels 9 and 10. Thus, the system 4 may be referred to as an auxiliary system which receives its control input signal through the pilot operated pedals 15. This pilot initiated control signal depends on the instantaneous pedal position which in the situation when no force is applied to the pedal, corresponds to or is equal to the trim command signal supplied through the trimmable force simulating unit 6. In the operated condition, that is, when the pilot applies a force to the pedal 15, the mechanical input control signal corresponds to the instantaneous pedal position. The trimmable force simulating unit 6 may be arranged near the vertical rudder 1 in the tail section of the aircraft as shown in FIG. 1 or it may be located directly at the foot pedals 15 in the cockpit as shown in FIG. 2. In the embodiment of FIG. 2, weight reductions may be accomplished by the proper dimensioning of the mechanical signal transmission from the pedals 15 to the drive system 4 in accordance with regulations.

Each of the electro-hydraulic drive systems 2 and 3 comprise, as is conventional, a switch-on valve which activates the respective drive system when the valve magnet is energized by the respective control signal. In FIGS. 1 and 2 the electrical control signals between the respective computers 8, 8b, and the drive systems 2 and 3 are indicated by the bus lines 11a and 12a. The signals for controlling the switch-on valves are symbolized by the conductors 11b and 12b. The signal buses 11a and 12a also transmit system monitoring signals and cylinder position representing sensor signals or piston position representing sensor signals.

The mechanically controlled drive system 4 comprises an electro-hydro-mechanical switch-off logic circuit or unit 5 shown by dashed lines in FIGS. 1 and 2 and in more detail in FIG. 5a to be described below. This switch-off logic 5 is controlled by the computers 8 . . . 8c of the electro-hydraulic control channels 9 and 10. These control computers provide switch-off signals on the conductors 13 and 14 and the logic switch-off unit 5 performs an AND-function.

Figure 5A:
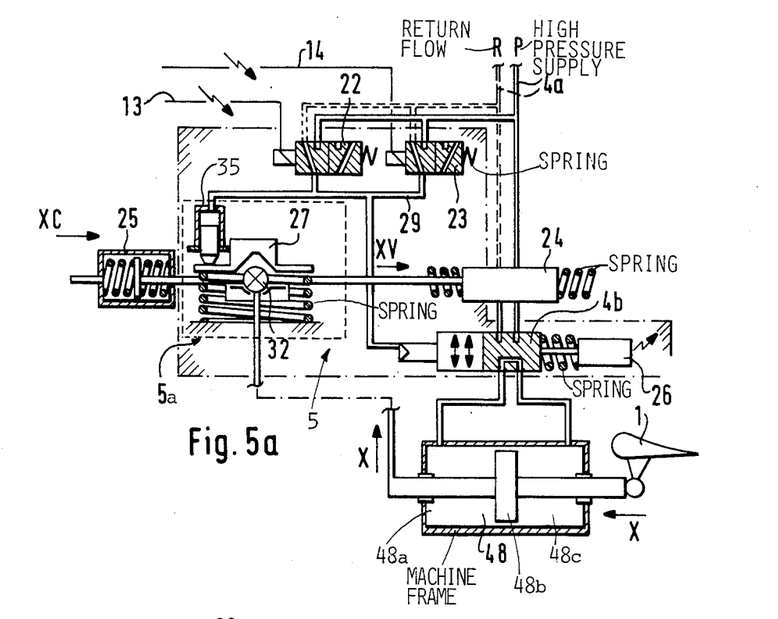
FIG. 5a is a hydraulic-mechanical logic circuit diagram for switching the auxiliary, mechanical drive between a non-effective and an effective or drive status.

Each of the switch-off signals on the conductors 13 or 14 is capable of activating the switch-off logic unit 5 shown in FIG. 5a. However, when both signals on the conductors 13 and 14 are absent, the switch-off logic unit 5 will be placed into a passive state, thereby activating the mechanically controlled drive system 4. When the logic unit 5 is activated, on the other hand, the mechanically controlled drive system is maintained in a bypass state and the mechanical signal transmitting path 7 from the pedals 15 to the control valve 24 of the mechanical drive system is interrupted. This situation is also present when the hydraulic system pressure supplying the drive system 4 is present. In this bypass state the drive system 4 does not provide any output power so that its piston follows freely the deflection of the vertical rudder caused by the operation of the primary drive systems 2 or 3 through the respective primary control channels 9 or 10.

When both logic signals on the conductors 13 and 14 are absent, the logic switch-off unit 5 is passivated: The signal summing point for operating the control valve 24 is engaged and the bypass position is cancelled, thus activating the mechanically controlled drive system while the mechanical control link between the pedals 15 and the control valve 24 is closed. Thus, when hydraulic system pressure is present the vertical rudder 1 may now be operated by the hydro-mechanical drive system 4.

Each computer 8, 8a and so forth to which the active and thus fault free operating control channels 9 or 10 are connected, transmits a positive switch-off signal on the conductors 13 and 14 as long as the control channel and the respective drive system 2 or 3 are in an active condition. These so transmitted signals on the conductors 13 and 14 keep the switch-off logic unit 5 active and thus the hydro-mechanical drive system 4 inactive as long as normal electrically signalled operating conditions prevail.

The circuitry of the entire system including mechanical connecting links from the pedals 15 and electrical connections from the computers 8 of the control channels 9 and 10 and of the respective drive systems 2, 3, and 4 as well as the change-over switching devices and switch-off devices according to the invention will now be described in conjunction with FIG. 2. Normally, when there is no fault in the entire system the rudder 1 is controlled by one of the active control channels 9 or 10 while the other of these two channels is in a passive or standby state. The control signals which determine the deflection of the rudder 1 are provided by the computer 8 which forms the control signals by taking into account signal components from the autopilot 19, signal components representing trim signals, or, when the autopilot 19 is switched off, signals representing displacements of the pedals 15 as sensed by position sensors 20. Either the active control channel 9 or the active control channel 10 transmits on the conductors 11a or 12a a positive control signal to the respective drive system 2 or 3 while the respective other standby control channel is interrupted so that no current flows in the control conduit to the respective drive system.

Both computers, namely the one presently operating the active control channel and the one presently connected to the standby control channel, provide a positive switch-off signal on the conductors 13 and 14 to the switch-off logic circuit 5 of the mechanically controlled hydro-mechanical drive system 4. Thus, the logic unit 5 is in an active state and mechanically controlled system 4 is in a bypass operation. In this electrical operation type the pedals 15 which are, by the way, decoupled from the vertical rudder 1 are caused to perform a follow-up motion in response to the trim signals produced by the trim heads 17 or in response to automatic trim signals from the computers as received through the trimmable force simulation unit 6 so that the pedal motions follow the actual trimmed state of the rudder. If desired, the pedals 15, under normal operating conditions, may also be caused to follow any rudder displacements in response to signals from the autopilot.

If a second fault or error occurs in the primary, electro-hydraulically controlled channels 9 and 10, the signals are absent on both conductors 13 and 14, whereby the switch-off logic unit 5 is deactivated. As a result, the hydro-mechanical drive system 4 is activated or coupled to the mechanical control link so that the pilot can now take over the deflection control of the vertical rudder with the aid of the pedals 15.

The control signals on the data buses 11a and 12a to the electro-hydraulically controlled drive systems 2 and 3 and the switch-off signals on the conductors 13 and 14 to the hydro-mechanically controlled drive system 4 are passed through a switching unit 18 under the control of the pilot. Under normal operating conditions all the switches in the switching unit 18 are closed. When a fault occurs or when the pilot wants to test the system, he may open these switches and thus interrupt the connection to the drive systems from the computers 8. This possibility of interrupting can be utilized individually for any one of the system connections or in combination for all connections.

The interruption of the conductors 13 and 14 causes an automatic switch-on of the mechanically controlled hydro-mechanical drive system 4. Thus, it is, for example, possible to perform a test procedure prior to take-off of an aircraft for ascertaining that the auxiliary drive system 4 is operational.

Figure 3:
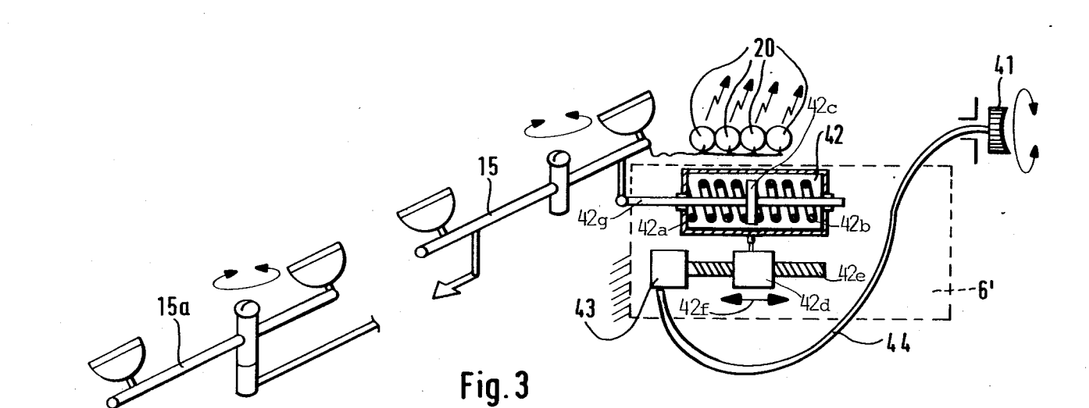
FIG. 3 shows an embodiment of a force simulating unit according to the invention.

FIG. 3 illustrates a trimmable force simulation unit 6' which may replace the conventional trimmable force simulation units 6 shown in FIGS. 1 and 2. The trimmable force simulating unit 6' of FIG. 3 applies a rudder deflection dependent force, but does not require any more a redundant motor displacement or adjustment. Rather, the trimmable force simulation unit 6' according to the invention is adjusted by an element 41 manually operated by the pilot. Thus, the invention obviates the respective electro-motor drives required by the prior art for the simulator 6. The respective connections between the obviated electro-motor drives and the trim head 17 are also avoided. Thus, possible trouble sources are reduced or eliminated. The trim signal input is accomplished through the adjustment element 41 without a motor by the pilot. The element 41 is connected, for example, by a flexible cable 44 to a gear 43 which adjusts the position of the flexible strut 42 comprising two helical springs 42a and 42b normally trying to bias a center member 42c into a center position. The center member 42c is connected to a nut 42d driven by a rotating, but axially stationary spindle 42e driven by the gear 43. Thus, the nut 42d can be moved axially back and forth as indicated by the arrow 42f. The center member 42c is mechanically linked to the pedal system 15 by an axially displaceable system 42g. The flexible strut 42 and thus pedals 15 can thus be adjusted by the member 41. In this embodiment neither the trim signal nor the autopilot adjustment signal cause a follow-up motion of the pedals 15. Stated differently, when the vertical rudder is controlled by the electric autopilot signals, the pedals remain stationary in the adjusted position.

Another embodiment of the invention uses the trimmable force simulators 6 and 6' in combination. In that case the electrical synchronization of the pedal displacement or follow-up movement with the vertical rudder deflection in accordance with the trim signal and the autopilot signal, with the aid of electromotors, may take place alongside a mechanical adjustment of the manual trim input element 41 for driving the gear 43 through the adjustment connection 44 as shown in FIG. 3. In such an embodiment it is possible for the pilot to adjust the vertical rudder to the desired trimmed position without a pedal force being effective even after a total electrical power failure and when the rudder operation takes place exclusively with the aid of mechanically signallized pedal control signals.

Figure 4A:
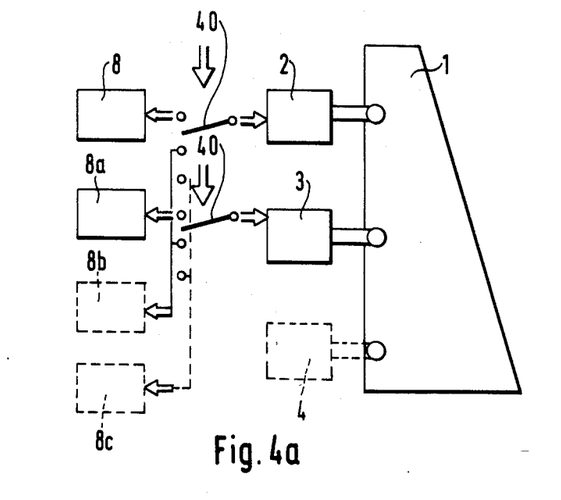
FIG. 4a shows the use of more than one control computer of the same type for each primary drive.
Figure 4B:
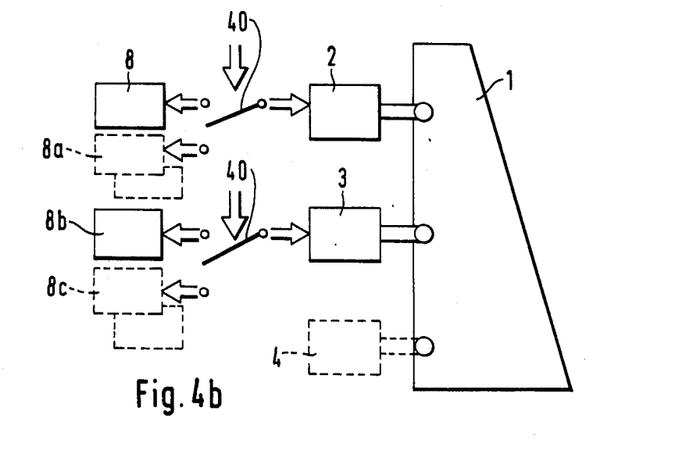
FIG. 4b shows the use of more than one control computer of different types for each primary drive.

FIGS. 4a and 4b illustrate possibilities for the networking of the computers and the electrical drive systems 2, 3 by means of switch-over devices in a control system equipped with redundant computers 8. FIG. 4a shows that each electrically controlled hydraulic drive system 2, 3 has at least one computer 8 ... 8c. Where each drive system has two or more computers, all of these computers are of the same type and switchable by switch 40 for connection to the respective drive system. FIG. 4b shows a system in which two computers of different types are available for each electrically controlled drive system 2, 3. Thus, if computer 8 fails, a switch-over can be made with the switch 40 to the computer 8a. Similarly, failure of computer 8b may be remedied by switching on computer 8c. Although not shown in FIGS. 4a and 4b, the switches 40 will switch over the entire signal buses 11a, 11b, 12a, 12b, and 13, as well as 14.

Figure 5B:
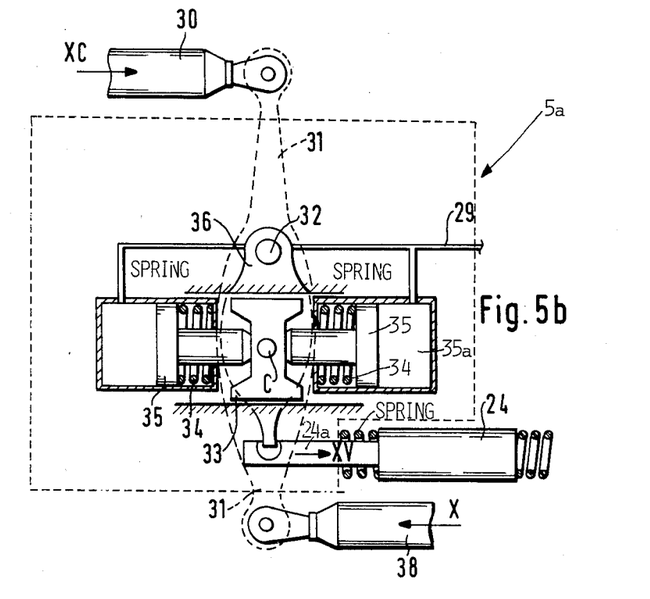
FIG. 5b is a coupling and synchronizing unit in the auxiliary mechanical drive.

Referring to FIGS. 5a and 5b, the function of the mechanically controlled drive system 4 and of the hydro-mechanical switch-off logic unit 5 will now be described. As mentioned, the drive system 4 is controlled by the absence of switch-off signals on conductors 13 and 14. As long as one of the signals is present on one of the conductors 13 and 14, the control pressure P is on the level of the return flow R and the bypass valve 4b is in its inactive bypass position. Simultaneously, the differential coupling 27 of the mechanical signal linkage 7 is interrupted as shown in FIG. 5a. In this passive state of the mechanically controlled hydro-mechanical drive system 4, one of the electrically controlled drive systems 2 or 3 moves the vertical rudder 1. The mechanical displacement or deflection feedback X of the piston 48b is taken up at the interrupted differential coupling 27 whether the pedal 15 is stationary or performs a follow-up movement. Such follow-up movement involves the displacement $X_c$ as caused or commanded by the trimmable force simulation unit 6 without providing instructions for a valve displacement $X_y$.

FIG. 5b illustrates the transition to the activated state of the drive system 4. In a conventional hydro-mechanic drive system 4 the pivot point C of the summing lever 36 is a fixed point secured, for example, to the housing. Contrary thereto according to the invention in the present system the pivot point C is permitted to float by the springs 34 and hence displaceable in the passive condition of the drive system 4 when there is no control pressure. Only when in the active condition the system pressure P corresponds to the control pressure, will the pivot point C assume a fixed position, that is, when signals on both conductors 13 and 14 are absent. In the passive condition on the other hand, the summing lever 36 tilts about the floating pivot point C when random deflections X of the vertical rudder 1 take place. Stated differently, the summing lever 36 can tilt around its connected pivot point C with the control slide 24a of the main control valve 24 so that the valve 35a centered by the springs 34 effective on the valve pistons 35 does not receive any valve displacement command signals when control pressure is absent in the passive state.

The just described coupling with a floating pivot point C which is responsive to control pressure with the effect of either opening, that is interrupting a differential summing linkage 27, or to close said linkage, has been shown with reference to a fixed housing and movable pistons 35. However, it is possible to achieve the same purpose by making the pistons 35 stationary and moving the valve housing 35a. The invention covers both possibilities.

Another feature of the present invention is the ability of the above described coupling 27 shown in FIG. 5b to self-synchronize with the position $X_c$ of the pedal position for any vertical rudder deflection X when the system is switched-over from the passive state into the active state. When the pivot point C is in the passive state and a positive control signal (positive control pressure) is applied as an input signal, for the switch-over of the mechanical drive system 4 from the passive state into the active state, the pivot point C is shifted relative to the housing if X deviates from $X_c$, whereby a valve displacement $X_y$ is caused or commanded. This valve displacement $X_y$ results in a movement of the piston 48b in the cylinder 48 while simultaneously the bypass valve 4b is switched into its active position. In this condition the control valve 24 is connected to the chambers 48a and 48c. The movement of the piston 48b represented by X corresponds to the vertical rudder position and is synchronized with the input signal corresponding to the displacement $X_c$, whereby the pivot point C now assumes its fixed centered position.

According to a further embodiment of the invention the vertical rudder control system is so constructed that the mechanically controlled drive system 4 is dimensioned for producing control forces which are larger than the control force produceable by the individual electric hydraulic control system 2 or 3. This feature enables the pilot to switch-off the electrically controlled channels 9 and 10 in case there is a fault and to activate the mechanically controlled drive system 4 to bring the vertical rudder 1 into the desired position even if any force exerted by the faulty passivated electrically controlled drive system 2 or 3 must be overcome by the force applied by the mechanical drive system 4. In this embodiment the electrically controlled drive systems 2 and 3 are equipped with pressure relief valves and these valves make sure that in case of a fault the rudder is enabled to follow the drive force exerted by the mechanically controlled drive system 4.

Figure 6:
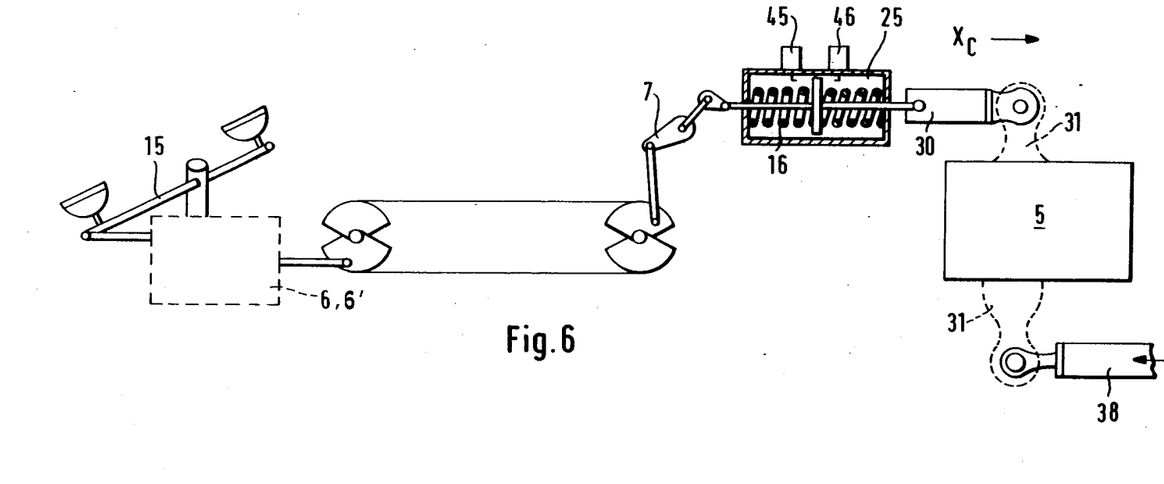
FIG. 6 is a schematic illustration of the mechanical control link in the auxiliary mechanical drive.

An advantageous embodiment of the invention relates to the monitoring of the mechanical control signal transmitting system or linkage 7 so that any mechanical faults in the linkage are detected, especially jamming situations in the couplings and in the mechanical links as well as in the differential signal transmitting linkage members 31, 32, 33, 34, 35, and 36, please see FIG. 5b and FIG. 6. A jamming situation which is not detected during the normal operation of the electrically controlled drive systems 2 and 3, a so-called sleeping fault, would make the mechanically controlled drive system 4 nonusable if the pilot should try to use it. In order to avoid that such a situation can occur, a defined flexible strut 25 is provided at the pilot input side to the mechanical drive system 4. The flexible or spring strut 25 performs the following function. Please refer to FIG. 6. If the pedal 15 is spring centered by the force simulating unit 6 or 6', the displacement feedback X of the piston is effective on the open differential 27 as shown in FIG. 5b and the eye of the differential lever 31 operated by the pilot is stationary since the signal displacement $X_c$ is equal to zero. If a jamming situation is present in this coupling mechanism, a vertical rudder deflection leads to a displacement $X_c$ by way of a feedback even though the differential is blocked or fixed. Since the pedals 15 are spring centered, that is, they do not move, this displacement $X_c$ at the signal input of the mechanical control system leads to a displacement of the mechanical control linkage which in turn compresses the spring 16 of the flexible spring strut 25 cooperating with two switches 45 and 46 which respond to a displacement of the signal take-off point and cause a warning signal. If a jamming situation is present, a warning will be provided when during flight the vertical rudder is operated as is to be expected. The switches 45 and 46 are constructed to be self-monitoring.

Another advantageous embodiment of the invention relates to the monitoring, more specifically, to the fault recognition in the mechanically controlled drive system 4 prior to take-off. The bypass valve 4b of the mechanically controlled drive system 4 is equipped with an electrical position sensor 26 which produces a warning signal during an automatic preflight test if the mechanically controlled drive system 4 should not be in its passive bypass state as shown in FIG. 5a.

Although the invention has been described with reference to specific example embodiments, it will be appreciated, that it is intended to cover all modifications and equivalents within the scope of the appended claims.

What I claim is:

1. A control system for controlling a vertical rudder of an aircraft, comprising pilot operated pedal means for generating a mechanical control signal, autopilot computer means for generating vertical rudder control signals, three hydraulic drive systems operatively connected to the vertical rudder, two electrical signal control channels for electrically transmitting rudder control signals from said autopilot computer and/or from sensors at pilot-operated pedal means to two of said three hydraulic drive systems which are electrically controlled, the third of said three hydraulic drive systems being mechanically controlled, each electrical signal control channel being connected to at least one control computer for monitoring and controlling the respective electrically controlled drive system, said third mechanically controlled drive system forming an auxiliary drive for driving said vertical rudder in an alternative manner or after both of the electrically controlled drive systems have failed, said mechanically controlled auxiliary drive system receiving its control input signal from the pilot operated pedals, whereby the arrangement is such that at any one moment only one of the three drive systems is active, and wherein, upon failure of any one of the three drive systems, that system is activated, which has the next highest switch-on priority, whereby the mechanically controlled drive system has the lowest switch-on priority and whereby the electrically controlled drive systems execute the vertical rudder deflection instructions produced by the respective control computer, e.g., from a pilot initiated control signal component, a trim signal component, an autopilot signal component, and a yaw damping signal component, means for causing said pedal means to assume a pedal position corresponding to trim instructions provided by a trimmable force simulating unit when a force is not applied to the pedal by the pilot, said mechanically controlled drive system taking into account a pedal position caused by the pilot for deflecting the vertical rudder by the mechanically controlled drive system, and switch-off logic means for normally keeping said mechanically controlled drive system in a passive bypass state in response to passivating signals on conductors (13, 14) connected to said computers of said electrical signal control channels of the two electrically controlled drive systems, whereby an absence of both passivating signals from the control computers signifies a system fault and the mechanically controlled drive system is activated by deactivating the logic switch-off unit.

2. The drive control of claim 1, wherein said electrically controllable drive systems (2, 3) and the mechanically controllable drive system (4) are so dimensioned, that their maximally possible output power is smaller than or equal to the vertical rudder deflection force occurring at high speed flight when the maximally permissible rudder deflection angle is reached that is necessary for steerability, said power output being sufficiently large for all steering requirements at low speeds.

3. The drive control of claim 1, wherein said trimmable force simulating unit (6 and/or 6') is located in the tail end of the aircraft.

4. The drive control of claim 1, wherein said trimmable force simulating unit (6 and/or 6') is located at the pedals in the cockpit.

5. The drive control of claim 1, comprising an electrically energizable magnet driven switch-on valve for activating each of said electrically controllable hydraulic drive systems (2, 3), and further electrically energizable magnet driven switch-off valve means (22, 23) arranged in a switch-off logic unit for passivating said mechanically controllable drive system (4) when said electrically controllable drive systems (2, 3) are free of faults and vice versa.

6. The drive control of claim 1, further comprising testing switching means (18) controllable by the pilot, said testing switching means being arranged in control channels between said drive systems and control computers, said testing switching means being normally closed but openable by the pilot in case of a fault or for testing purposes.

7. The drive control of claim 6, wherein said testing switching means are so arranged that the pilot may interrupt individual control conductors in said control channels or he may interrupt all control conductors.

8. The drive control of claim 1, wherein said trimmable force simulating unit requires the pilot to apply a force which depends in its size to a respective rudder deflection, said trimmable force simulating unit obviating a motor driven follow-up motion of said pedals, and means (41) for manually adjusting said force simulating unit.

9. The drive control of claim 8, wherein said means for manually adjusting said force simulating unit comprise a pilot operable button, an adjustment gear, flexible centering spring means for adjusting a pedal force free null position of said pedals, first means operatively connecting said adjustment gear to said centering spring means, second means operatively connecting said button to said adjustment gear for adjusting said centering spring means.

10. The drive control of claim 9, wherein two different types of force simulating units are combined.

11. The drive control of claim 1, wherein each of said electrically controlled hydraulic drive systems (2, 3) has at least one control computer, preferably more control computers of the same type, said computer or computers providing also control signals for passivating and activating said switch-off logic unit (5) of said mechanically controlled drive system.

12. The drive control of claim 1, wherein each of said electrically controlled drive systems has two or more control computers of the same type, whereby different computer types are used in the two electrically controlled drive systems, said computers controlling said switch-off logic unit (5) of said mechanically controlled drive system (4).

13. The drive control circuit of claim 1, wherein said switch-off logic unit (5) comprises differential means (27) which in the activated state makes sure that a mechanical displacement feedback (X) of a piston of said mechanically controlled drive system (4) is absorbed or taken up, regardless whether said pedals (15) are stationary or moving, without providing a valve displacement ($X_v$) command signal, and wherein a bypass valve (4b) switches said mechanically controlled drive system (2) into an inactive bypass position.

14. The drive control of claim 13, wherein said differential means (27) of said switch-off logic unit (5) comprises a summing lever (36) having a pivot point (C) which is floating in the passive state of said mechanically controlled drive system (4), and means enabling said floating pivot point to assume a fixed position in response to a control pressure corresponding to the hydraulic system pressure.

15. The drive control of claim 14, wherein said enabling means comprise biasing spring means (34) for said summing lever (31) which permit said floating of said pivot point (C) in the absence of a control pressure.

16. The drive control of claim 1, wherein said mechanically controlled drive system (4) comprises piston means and cylinder means, whereby said piston means are stationary and said cylinder means are movable.

17. The drive control of claim 13, wherein said switch-off logic unit (5) comprises means for causing a self-synchronization of the pedal position ($X_c$) at any random vertical rudder position (X) during a switchover of said mechanically controlled drive system (4) from its passive state to its active state.

18. The drive control of claim 1, wherein said electrically controlled drive systems (2, 3) and said mechanically controlled drive system (4) are so dimensioned that said mechanically controlled drive system (4) has a larger power output than any one of said electrically controlled drive systems (2, 3).

19. The drive control of claim 1, wherein said electrically controllable drive systems (2, 3) and the mechanically controllable drive system (4) are so dimensioned, that their maximally possible output power is smaller than or equal to the vertical rudder deflection force occurring at high speed flight when the maximally permissible rudder deflection angle is reached that is necessary for steerability, said power output being sufficiently large for all steering requirements at low speeds, and wherein said electrically controlled drive systems (2, 3) and said mechanically controlled drive system (4) are so dimensioned that said mechanically controlled drive system (4) has a larger power output than any one of said electrically controlled drive systems (2, 3), and wherein said computers (8) take into account a dimensioned over-control situation in said electrically controlled drive systems.

20. The drive control of claim 1, further comprising sensor switch means (45, 46) arranged for cooperation with said mechanical differential coupling linkage of said mechanically controlled drive system (4) for monitoring said coupling linkage against mechanical faults, said switch means providing a warning signal when a fault is detected.

21. The drive control of claim 1, wherein said mechanically controlled drive system (4) comprises a bypass valve (4b) and a position sensor (26) for monitoring said bypass valve (4b), whereby the passive state of said mechanically controlled drive system (4) caused by an activated state of said switch-off logic unit (5), can be automatically tested in a preflight test.

22. The drive control of claim 1, further comprising excess pressure relief valve means in said electrically controlled drive systems (2, 3) for making certain that said mechanically controlled drive system can drive said vertical rudder even if any one of said electrically controlled drive systems (2, 3) is active, i.e.: in a failure case the mechanically controlled drive system can override the still active electrically controlled drive system.

23. The drive control of claim 1, further comprising pilot operated test switching means (18) through which all control signals for said electrically controlled drive means (2, 3) pass and through which all switch-off signals for said mechanically controlled drive means (4) pass.

24. The drive control of claim 1, wherein one trimmable force simulating unit is replaceable by another trimmable force simulating unit.

* * * * *